United States Patent
Lilie et al.

(10) Patent No.: US 9,353,862 B2
(45) Date of Patent: May 31, 2016

(54) PISTON FOR A RECIPROCATING HERMETIC COMPRESSOR

(71) Applicant: Whirlpool S.A., São Paulo-Sp (BR)

(72) Inventors: Dietmar Erich Bernhard Lilie, Joinville-Sc (BR); Fábio Henrique Klein, Joinville (BR); Fabricio Caldeira Possamai, Joinville-Sc (BR); Hugo Renato Seibel, Joinville-Sc (BR); Ivan Da Costa Pereira Filho, Joinville-Sc (BR); Marcio Luiz Todescat, Joinville-Sc (BR)

(73) Assignee: Whirlpool S.A., São Paulo-Sp (BR)

( * ) Notice: Subject to any disclaimer, the term of this patent is extended or adjusted under 35 U.S.C. 154(b) by 302 days.

(21) Appl. No.: 14/019,833

(22) Filed: Sep. 6, 2013

(65) Prior Publication Data

US 2014/0000452 A1    Jan. 2, 2014

Related U.S. Application Data

(63) Continuation-in-part of application No. 10/484,822, filed as application No. PCT/BR02/00103 on Jul. 24, 2002, now Pat. No. 8,549,988.

(30) Foreign Application Priority Data

Jul. 25, 2001  (BR) .................................... 0104001

(51) Int. Cl.
   *F16J 1/18*    (2006.01)
   *F16J 1/16*    (2006.01)
   *F04B 53/14*   (2006.01)

(52) U.S. Cl.
   CPC . *F16J 1/16* (2013.01); *F04B 53/14* (2013.01); *F16J 1/18* (2013.01)

(58) Field of Classification Search
   CPC ......................................................... F16J 1/18
   See application file for complete search history.

(56) References Cited

U.S. PATENT DOCUMENTS

| 1,285,755 | A | 11/1918 | McCuen |
| 1,591,343 | A | 7/1926 | Redfield |
| 2,422,327 | A | 6/1947 | Winslow |
| 2,703,264 | A | 3/1955 | Pitner |

(Continued)

FOREIGN PATENT DOCUMENTS

| DE | 2757570 A1 | 6/1979 |
| DE | 19522210 C1 | 1/1997 |

(Continued)

*Primary Examiner* — F. Daniel Lopez
(74) *Attorney, Agent, or Firm* — Dinsmore & Shohl LLP

(57) ABSTRACT

The piston is provided with a pair of radial holes opened to an external circumferential recess and lodging and retaining one respective end of a pin, to which is coupled a driving mechanism to reciprocate the piston inside a cylinder. The radial holes are completely sealed in order that the axial extension of a bottom radial gap provided by a bottom bearing surface of the piston work together with the axial extension of a top radial gap provided by a top bearing surface to provide the required leakage restriction of the refrigerant gas and also the required bearing of the piston inside the cylinder. The axial extension of each of the top bearing surface and of the bottom bearing surface is insufficient to provide by itself said required leakage restriction of the refrigerant gas.

9 Claims, 3 Drawing Sheets

(56) References Cited

U.S. PATENT DOCUMENTS

| | | |
|---|---|---|
| 3,574,293 A | 4/1971 | Vriend |
| 3,757,581 A | 9/1973 | Mankin et al. |
| 4,050,360 A | 9/1977 | Powers et al. |
| 4,124,978 A | 11/1978 | Wagner |
| 4,574,591 A | 3/1986 | Bertsch |
| 5,050,485 A * | 9/1991 | Hoult .................. F16J 1/08 123/193.6 |
| 5,403,170 A | 4/1995 | Bianchi et al. |
| 5,421,245 A | 6/1995 | Christoffel et al. |
| 5,850,777 A | 12/1998 | Marklin et al. |
| 8,549,988 B2 * | 10/2013 | Lilie .................. F04B 39/0005 92/187 |

FOREIGN PATENT DOCUMENTS

| | | |
|---|---|---|
| FR | 1144413 A | 10/1957 |
| GB | 954003 A | 4/1964 |
| GB | 1577352 A | 10/1980 |

* cited by examiner

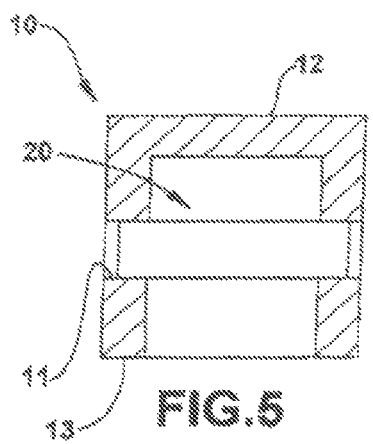
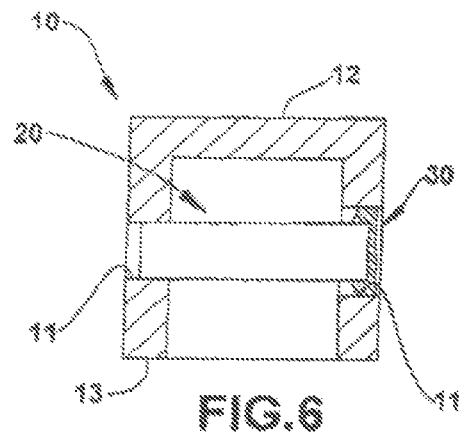
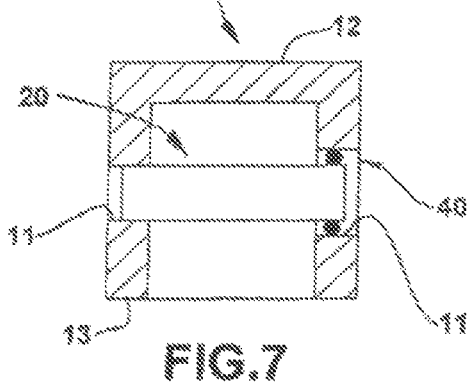
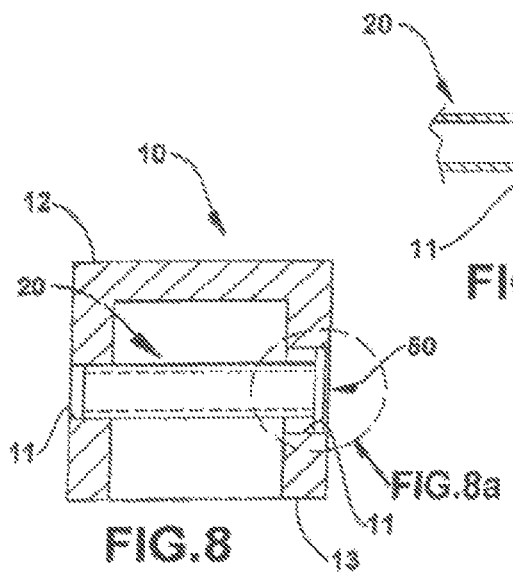
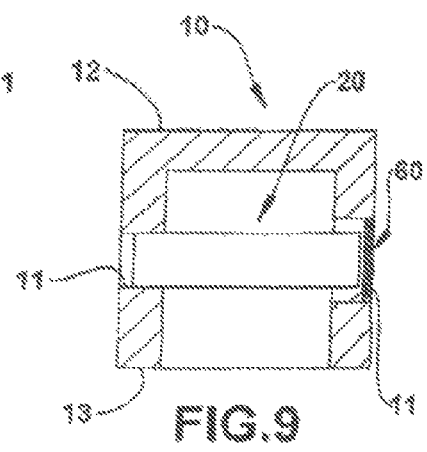

PISTON FOR A RECIPROCATING HERMETIC COMPRESSOR

CROSS REFERENCE TO RELATED APPLICATIONS

This application is a continuation in part of U.S. patent application Ser. No. 10/484,822 filed on Jul. 27, 2004, which claims priority to U.S. national phase of PCT/BR2002/00103 filed Jul. 24, 2002, which claims priority of Brazil Patent Application PI 0104001-4 filed Jul. 25, 2001, which is incorporated herein by reference.

FIELD OF THE INVENTION

The present invention refers generally to a piston for a reciprocating hermetic compressor of the type used in small refrigeration appliances said piston including a pin that articulates the connecting rod in the pair of opposite radial holes medianly provided in the piston.

BACKGROUND OF THE INVENTION

In the reciprocating hermetic compressors operated by a piston and normally used in small refrigeration systems or appliances, the compression of the refrigerant gas is obtained by the reciprocating movement of the piston inside a cylinder, between the displacement limits determined by the driving mechanism known as the lower dead point and the higher dead point. The cylinder has an open end, and an opposite end closed by a valve plate that defines one of the ends of a compression chamber, which other end is defined by the piston top.

In order that the movement of the piston inside the cylinder occurs in an adequate manner, it is necessary to provide a radial gap between the piston of smaller diameter and the cylinder of larger diameter.

During the operation of the compressor, the radial gap is partially filled with lubricant oil, bearing the piston and preventing wear between the movable parts. This bearing leads to a dissipation of mechanical energy, in order to overcome the viscous friction produced by the oil and by the movement of the piston.

When the piston is displaced from the lower dead point to the higher dead point, the refrigerant gas is compressed in the compression chamber, increasing its pressure in relation to the pressure of the gas existing inside the shell of the compressor, and causing a pressure differential that tends to produce leakage inside the shell, through the radial gap, of part of the refrigerant gas being compressed in the compression chamber. This phenomenon characterizes a volumetric loss and reduces the refrigeration capacity of the compressor, since the leakage causes a compression operation to be performed on a certain quantity of refrigerant gas that is directed to the inside of the shell. This loss directly reduces the energetic efficiency of the compressor.

The bearing of the piston, as well as the leakage of the compressed gas are functions mainly of the diameters and lengths of the cylinder and piston, of the distance traveled by the piston, of the rotational speed of the driving shaft, of the geometry of the driving mechanism, of the type of refrigerant gas used, of the type of lubricant oil, and of the operational conditions of the compressor (pressures and temperatures).

The piston is connected to the driving mechanism, which generally comprises a connecting rod, by means of a pin having opposite ends lodged and retained in a pair of diametrically opposite radial holes provided in the median region of the piston. The assembly of the pin to the radial holes of the piston is made, so that these two opposite regions represent a restriction to the flow of refrigerant gas that leaks by the radial gap existing between the cylinder and a piston top bearing surface, which is defined between the piston top and a transversal plane containing the pin axis, said restriction being smaller than the restriction to said flow of refrigerant gas imposed by the radial gap existing between the cylinder and the piston bottom bearing surface defined between the bottom of the piston and said transversal plane.

Thus, in the known assemblies, the refrigerant gas tends to leak by the radial gap from the top of the piston to the inside thereof, through median radial holes of the piston. Thus, only the axial extension of the piston top bearing surface has also the function of restricting the leakage of gas through the radial gap, mainly during the compression cycle, since in the suction cycle the reverse leakage that may occur can be ignored, besides being considered positive in terms of volumetric efficiency of the compressor. However, the axial extension of the piston bottom bearing surface, which is defined between the bottom of the piston and the pin, and which does not have a restrictive function against the leakage of refrigerant gas, leads to power dissipation by viscous friction.

The high efficiency compressors have an external circumferential recess in the median region of the piston, in which the radial holes are provided for mounting the pin, separating the above mentioned top and bottom bearing surfaces. This artifice is used to reduce the power dissipated in the bearing of the piston, without increasing the leakage of refrigerant gas by the radial gap, since the axial extension of the piston top bearing surface is maintained at a minimum value sufficient to guarantee a required leakage restriction against the flow of refrigerant gas through the radial gap in this region. The piston bottom bearing surface is maintained to guide the piston, producing viscous friction and having no positive effect considered relevant to restrict the leakage of refrigerant gas.

OBJECT OF THE INVENTION

The object of the present invention is to provide a piston of the type considered herein, which presents a smaller overall bearing surface, in order to reduce the power dissipation in the piston, without causing any decrease in the capacity of restricting the leakage of refrigerant gas by the radial gap defined between the piston and the cylinder.

SUMMARY OF THE INVENTION

The above object is achieved by providing a piston for a reciprocating hermetic compressor comprising a cylinder defining a compression chamber, said piston being provided with a pair of radial holes opened to an external circumferential recess of the piston and lodging and retaining one respective end of a pin, to which is coupled a driving mechanism to reciprocate the piston inside the cylinder, the piston presenting a top bearing surface and a bottom bearing surface, each one maintaining a respective radial gap, with the cylinder and being positioned in one side of the circumferential recess.

According to the invention the radial holes are completely sealed in relation to the two radial gaps, in order that the axial extension of the radial gap provided by the bottom bearing surface work together with axial extension of the radial gap provided by the top bearing surface to provide the required leakage restriction of the refrigerant gas outwardly and inwardly in relation to the compression chamber and also the required bearing of the piston inside the cylinder, the axial extension of each of the top bearing surface and of the bottom bearing surface being insufficient to provide by itself said required leakage restriction of the refrigerant gas.

According to the invention, both radial gaps operate, together and as a function of their respective axial extensions, as means for restraining the leakage of refrigerant gas outwardly and inwardly in relation to the compression chamber.

The constructive conception proposed herein provides the complete sealing of the joint between the ends of the pin and the piston, that is, the complete sealing of the two radial holes of the piston, in order to eliminate the leakage of refrigerant gas through said radial holes and to allow the radial gap, between the piston bottom bearing surface and the cylinder, to operate also as a means for restraining the leakage of refrigerant gas through said gap.

The proposed technical solution allows using a smaller axial extension for any of the top and bottom bearing surfaces, which although being insufficient to provide individually, the required leakage restriction, can reduce the axial extension of said the piston top and/or bottom bearing surfaces, considering that the piston is provided with an external circumferential recess in its median region. Reduction of the total axial extension of the total piston bearing surface reduces the area of viscous friction and, consequently, the power dissipation in the piston.

BRIEF DESCRIPTION OF THE DRAWINGS

The invention will be described below, with reference to the enclosed drawings, in which:

FIGS. 5, 6, 7, 8, 8a, and 9 show, schematically and in a diametrical sectional view, the piston with different constructive solutions for sealing the radial holes of the piston close to the respective ends of the pin.

DESCRIPTION OF THE ILLUSTRATED EMBODIMENTS

Figure 1:
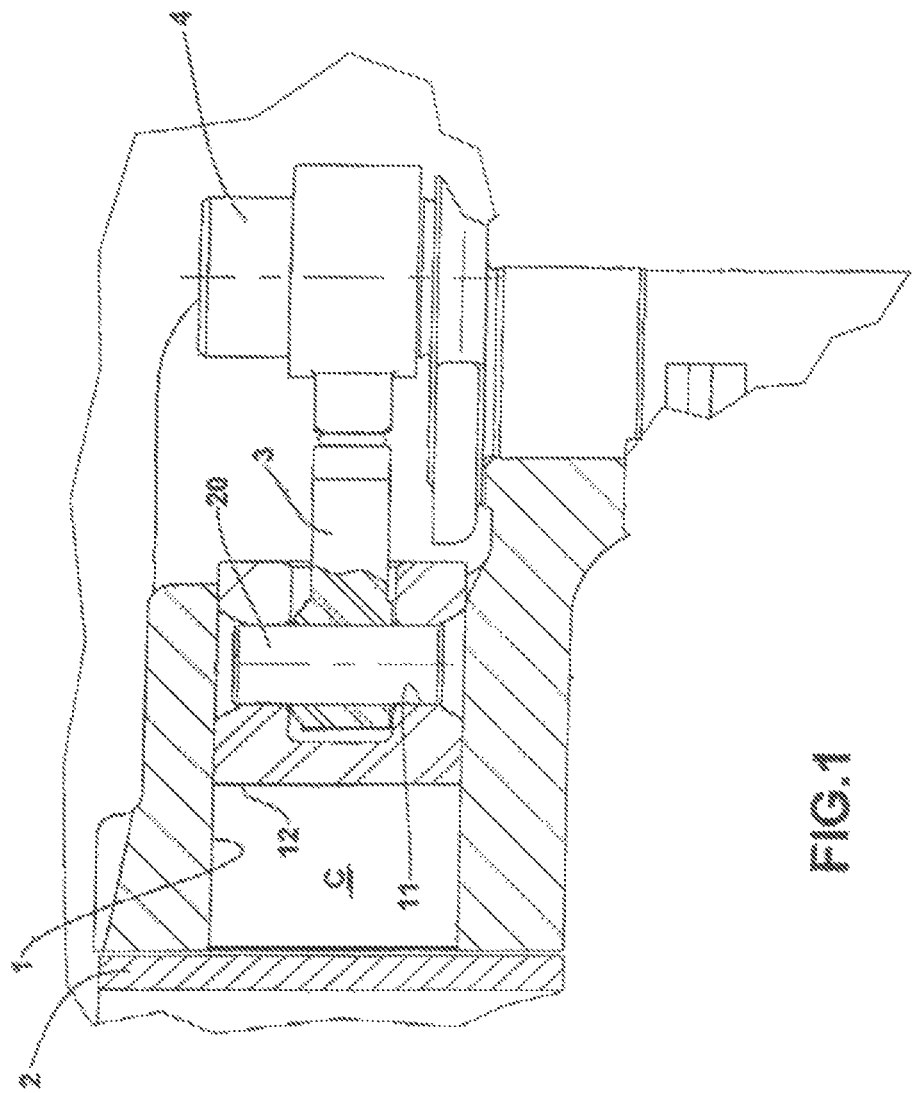
FIG. 1 illustrates, schematically, a sectional view of a cylinder-piston assembly for a reciprocating hermetic compressor used in the present invention.

As illustrated in FIG. 1, the present invention is applied to the piston of a reciprocating hermetic compressor of the type comprising a cylinder 1, with an open end, and with the opposite end generally closed by a valve plate 2, inside the cylinder being mounted a piston 10 that defines, with the closed end of the cylinder 1, a compression chamber C.

Piston 10 is provided, in the median region thereof, with a pair of radial holes 11, which are diametrically opposite, each lodging and retaining one end of a pin 20, to which is coupled a driving mechanism of the compressor to reciprocate the piston 10 inside the cylinder 1, varying the volume of the compression chamber C. In the illustrated construction, the driving mechanism is defined by a connecting rod 3 with a smaller eye mounted around the pin 20, and with a larger eye mounted to the eccentric of the shaft 4 of the compressor.

Figure 2:
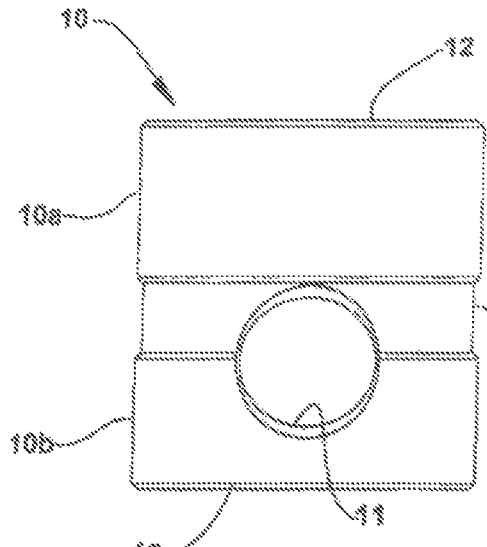
FIGS. 2-3 is an enlarged lateral view of a piston with the mounting arrangement of the prior art, and a piston with the mounting arrangement of the present invention, respectively.

As it can be noted by FIG. 2, the piston 10, which is constructed to receive the prior art mounting arrangement, presents a piston top bearing surface 10a, disposed between the top 12 of the piston 10 and a transversal plane containing the axis of the pin 20, and a piston bottom bearing surface 10b, disposed between said transversal plane and the bottom 13 of the piston 10.

Figure 3:
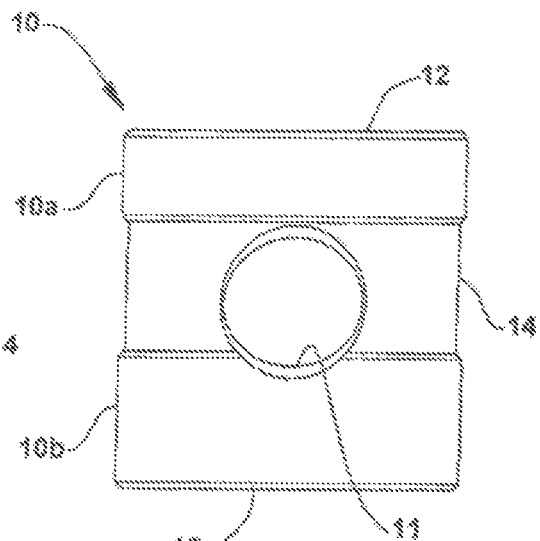
Figure 4:
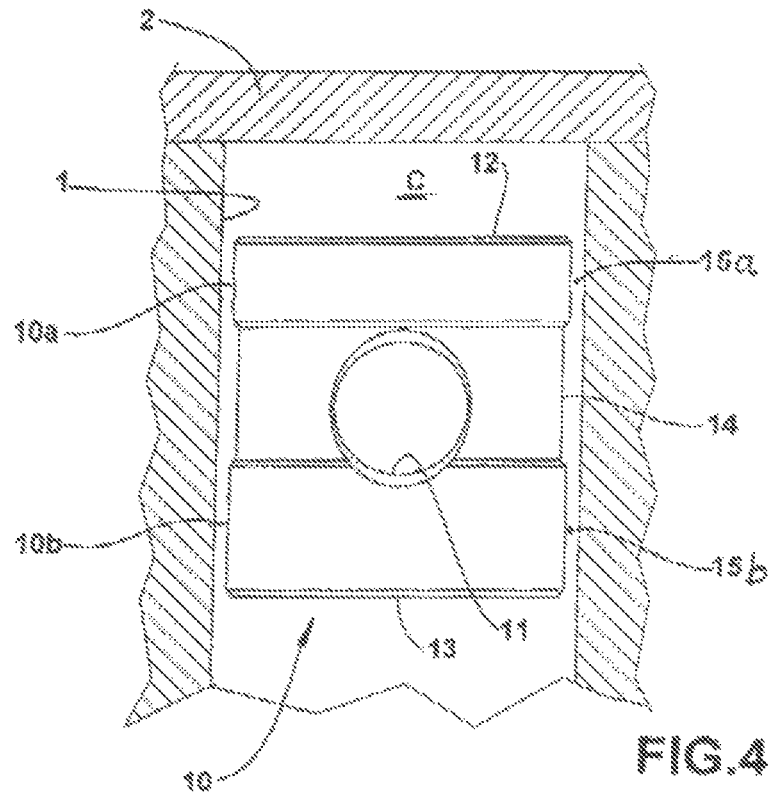
FIG. 4 is a lateral view of the piston of FIG. 3, but mounted inside a cut and partially shown cylinder.

In the exemplary construction illustrated in FIGS. 2-4, the piston 10 is further medianly provided with an external circumferential recess 14, separating the two bearing surfaces and to which are opened the radial holes 11. According to the prior art, the piston bottom bearing surface 10b presents an axial extension that is defined solely by the bearing requirements of the piston 10 in its reciprocating displacement, since the bottom radial gap 15b, which is defined between this piston bottom bearing surface 10b and the cylinder 1 does not operate as a restraining or limiting means to the leakage of refrigerant gas outwardly and inwardly in relation to the compression chamber C. The refrigerant gas leaks between the interior and the exterior of the compression chamber C, through the gaps existing between the ends of the pin 20 and the respective radial holes 11 of the piston 10. Thus, only the top radial gap 15a defined between the cylinder 1 and the piston top bearing surface 10a operates as a restraining means to the leakage of refrigerant gas, requiring that the axial extension of the piston top bearing surface 10a is sufficient to assure adequate sealing of the compression chamber C. Thus, the bearing of piston 10 is performed by the overall bearing surface extension, which is only partially used as a restraining means to the leakage of refrigerant gas, but integrally operating as a viscous friction generating means.

FIGS. 3-4 illustrate a piston 10, which is constructed as proposed herein. In this case, mounting the ends of pin 20 to the respective radial holes 11 of piston 10 is made so as to seal completely said radial holes 11. Therefore, in order to leak in relation to the compression chamber C, the refrigerant gas is forced to pass through the top and bottom radial gaps 15a, 15b throughout the length of the piston 10, that is, the bottom radial gap 15b defined between the piston bottom bearing surface 10b and the cylinder 1 now also operates as a restraining means to the leakage of refrigerant gas.

With the new construction, the restriction to the leakage is now obtained by the top and bottom radial gaps 15a, 15b related to both top and bottom bearing surfaces, 10a and 10b, which can have their total extension reduced in order to reduce the viscous friction, and to assure a better sealing for the compression chamber C.

As best seen in at least one embodiment of the present invention by comparing FIGS. 2 and 3 the top bearing surface 10a preferably has a length less than the axial length of the lower surface 10b.

Considering that the radial holes 11 are completely sealed, and that the bottom radial gap 15b also works for restricting the gas leakage, the sum of the axial extensions of both the top and bottom bearing surfaces 10a, 10b, becomes excessive in relation to the required gas leakage restriction.

According to the invention, with the sealing of the radial holes 11 anyone or both of the axial extensions of the bearing surfaces 10a, 10b can be reduced to a value in which the sum of the new axial extensions can be only sufficient to provide the necessary gas leakage restriction, allowing to reduce the total axial extension of the piston bearing surfaces and consequently the area of viscous friction and power dissipation in the piston.

According to the invention the axial extension of each of the top bearing surface and of the bottom bearing surface is insufficient to provide by itself said required leakage restriction of the refrigerant gas.

The sealing of the radial holes 11 can be obtained by any adequate means such as, for example, those described below.

In FIG. 5 there is shown a construction in which the sealing of both radial holes 11 of the piston 10 is obtained by mounting interference between each end of the pin 20 and the respective radial hole 11 in which it is lodged.

FIG. 6 illustrates a construction in which the sealing of one of the radial holes 11 of piston 10 is made by mounting interference with the respective end of pin 20, the sealing of the other radial hole 11 being obtained by a sealing element 30 which, in the example of FIG. 6, is defined by an adhesive applied between said radial hole 11 and the respective end of pin 20.

FIG. 7 illustrates a constructive variant for the arrangement of FIG. 6, according to which the sealing element 40 takes the form of an elastomeric sealing ring that is compressively mounted between the end of pin 20 and the respective radial hole 11 in which it is lodged.

In FIG. 8 there is further illustrated a constructive variant of FIG. 6, according to which the sealing element 50 is defined by a clamp, which is axially fitted in an end axial hole of the pin 20 and has an end flange 51, which is peripherally and sealingly seated inside the respective radial hole 11, as better illustrated in FIG. 8a. The peripheral edge of the end flange 51 can be constructed to define a sealing means to be seated against the wall of the radial hole 11.

FIG. 9 illustrates one more constructive variant for the arrangement of FIG. 6, according to which the sealing element 60 is defined by a cover fitted and retained inside the radial hole 11 to be sealed externally to the adjacent end of the pin 20.

It should be understood that the sealing elements 30, 40, 50 and 60 might be provided in both radial holes 11, when the pin 20 is slidingly and loosely fitted in both radial holes 11.

This pin 20, which is mounted without mounting interference, can use an elastic ring that actuates against the wall of both radial holes 11, in order to cause the axial retention of the pin 20 in the piston 10.

Nothing has been found in the prior art that shows a piston with a circumferential recess to reduce the total bearing area of the piston nor a sealing of the two radial holes to provide for the bottom bearing surface to be also used for gas restriction during operation of the piston.

The constructive options described herein have been given by way of example only. The axial retention of the pin 20 and the sealing of the radial holes 11 may be obtained by other manners, without departing from the scope of protection defined by the appended claims.

The invention claimed is:

1. A piston for a reciprocating hermetic compressor comprising a cylinder defining a compression chamber, said piston being provided with a pair of radial holes opened to an external circumferential recess of the piston and lodging and retaining one respective end of a pin, to which is coupled a driving mechanism to reciprocate the piston inside the cylinder, the piston presenting a top bearing surface and a bottom bearing surface, the top bearing surface is continuous and the bottom bearing surface is continuous, and wherein the top bearing surface and the bottom bearing surface maintain a respective top and bottom radial gap with the cylinder and which are positioned on opposite sides of the circumferential recess, characterized in that the radial holes are completely sealed in relation to the top and bottom radial gaps and the top bearing surface has a length less than the axial length of the lower bearing surface, in order that the axial extension of the bottom radial gap provided by the bottom bearing surface work together with the axial extension of the top radial gap provided by the top bearing surface to provide a required leakage restriction of a refrigerant gas outwardly and inwardly in relation to the compression chamber and also the required bearing of the piston inside the cylinder, the axial extension of each of the top bearing surface and of the bottom bearing surface being insufficient to provide by itself said required leakage restriction of the refrigerant gas.

2. The piston, according to claim 1, characterized in that the top bearing surface is external to the contour of the radial holes.

3. The piston, according to any one of claim 1, characterized in that the axial extension of the circumferential recess is larger than the radius of the radial holes.

4. The piston, according to any of claim 1, characterized in that the sealing of at least one of the radial holes is obtained by mounting interference between one end of the pin and the respective radial hole in which it is lodged.

5. The piston, according to any of claim 1, characterized in that the sealing of at least one of the radial holes is obtained by a sealing element, mounted in said radial hole.

6. The piston, according to claim 5, characterized in that the sealing element is defined by an adhesive applied between one end of the pin and said radial hole.

7. The piston, according to claim 5, characterized in that the sealing element is defined by an elastomeric sealing ring mounted so as to be compressed between one end of the pin and said radial hole.

8. The piston, according to claim 5, characterized in that the sealing element is defined by a clamp axially fitted into an end of the pin and having an end flange, which is peripherally and sealingly seated inside said radial hole.

9. The piston, according to claim 5, characterized in that the sealing element is defined by a cover fitted inside said radial hole externally to the adjacent end of the pin.

* * * * *